(12) United States Patent
Nakamura et al.

(10) Patent No.: US 10,437,251 B2
(45) Date of Patent: Oct. 8, 2019

(54) METHOD FOR SPECIFYING POSITION, TERMINAL DEVICE, AUTONOMOUS DEVICE, AND PROGRAM

(71) Applicant: Panasonic Intellectual Property Corporation of America, Torrance, CA (US)

(72) Inventors: Tomonori Nakamura, Shiga (JP); Koji Asai, Shiga (JP); Katsushige Amano, Shiga (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 197 days.

(21) Appl. No.: 15/462,079

(22) Filed: Mar. 17, 2017

(65) Prior Publication Data

US 2017/0277196 A1 Sep. 28, 2017

Related U.S. Application Data

(60) Provisional application No. 62/312,794, filed on Mar. 24, 2016.

(30) Foreign Application Priority Data

Aug. 30, 2016 (JP) .................................. 2016-168579

(51) Int. Cl.
*G05D 1/02* (2006.01)
*G05B 19/402* (2006.01)
(Continued)

(52) U.S. Cl.
CPC .......... *G05D 1/0246* (2013.01); *A47L 9/2815* (2013.01); *A47L 9/2826* (2013.01);
(Continued)

(58) Field of Classification Search
CPC .... A47L 9/2815; A47L 9/2826; A47L 9/2852; A47L 9/2857; A47L 9/2894;
(Continued)

(56) References Cited

U.S. PATENT DOCUMENTS

2009/0024251 A1* 1/2009 Myeong ............... G05D 1/0246
700/259
2012/0213443 A1* 8/2012 Shin ..................... G05D 1/0246
382/190
(Continued)

FOREIGN PATENT DOCUMENTS

JP 2009-129058 6/2009

OTHER PUBLICATIONS

Raphael, JP. (Dec. 9, 2009). Google Goggles Visual Search. Retrieved Nov. 26, 2018, from https://www.computerworld.com.au/article/print/329134/google_goggles_visual_search/ (Year: 2009).*

*Primary Examiner* — Robert T Nguyen
(74) *Attorney, Agent, or Firm* — Greenblum & Bernstein, P.L.C.

(57) ABSTRACT

A method for controlling an autonomous device that moves in two dimensions using a controller includes obtaining a first image at a first position, which is a destination of the autonomous device, calculating, from the first image, first feature values indicating certain characteristics of the first image, referring to map information indicating correspondences between coordinate information indicating coordinates of defined positions included in a movement area of the autonomous device and second feature values, which are calculated from second images and indicate certain characteristics of the second images and identifying, by referring to the map information, a second position corresponding to second feature values having at least a predetermined degree of correspondence to the feature values generating a command for moving the autonomous device to the second
(Continued)

position on the basis of coordinate information corresponding to the second position, and transmitting the command to the autonomous device.

13 Claims, 17 Drawing Sheets

(51) Int. Cl.
    *G05B 19/406* (2006.01)
    *A47L 9/28* (2006.01)
    *G06K 9/00* (2006.01)
    *G06T 1/00* (2006.01)
    *G05D 1/00* (2006.01)
    *G06T 7/73* (2017.01)

(52) U.S. Cl.
    CPC .......... *A47L 9/2852* (2013.01); *A47L 9/2857* (2013.01); *A47L 9/2894* (2013.01); *G05B 19/402* (2013.01); *G05B 19/406* (2013.01); *G05D 1/0016* (2013.01); *G05D 1/0274* (2013.01); *G06K 9/00664* (2013.01); *G06K 9/00691* (2013.01); *G06T 1/0014* (2013.01); *G06T 7/73* (2017.01); *A47L 2201/04* (2013.01); *G05B 2219/40572* (2013.01); *G05D 2201/0215* (2013.01)

(58) Field of Classification Search
    CPC . A47L 2201/04; G05B 19/402; G05B 19/406; G05B 2219/40572; G05D 1/0016; G05D 1/0246; G05D 1/0274; G05D 2201/0215; G06K 9/00664; G06K 9/00691; G06T 1/0014; G06T 7/73
    See application file for complete search history.

(56) References Cited

U.S. PATENT DOCUMENTS

| | | | |
|---|---|---|---|
| 2013/0073088 A1* | 3/2013 | Lee | G05D 1/0225 700/259 |
| 2016/0147230 A1* | 5/2016 | Munich | G05D 1/0246 701/28 |
| 2018/0098200 A1* | 4/2018 | Ishiyama | G05D 1/02 |
| 2018/0224862 A1* | 8/2018 | Akazawa | G06T 7/74 |

* cited by examiner

FIG. 9

| tE2AEF | 1 | (20, 0) | FEATURE VALUE A | (10, 20, 200) |
| | | | FEATURE VALUE B | (100, -20, 200) |
| | | | FEATURE VALUE C | (500, 70, 200) |
| | | | ... | ... |
| | 2 | (40, 40) | FEATURE VALUE D | (10, 20, 200) |
| | | | FEATURE VALUE E | (100, -20, 200) |
| | | | FEATURE VALUE F | (500, 70, 200) |
| | | | ... | ... |

94    96

METHOD FOR SPECIFYING POSITION, TERMINAL DEVICE, AUTONOMOUS DEVICE, AND PROGRAM

BACKGROUND

1. Technical Field

The present disclosure relates to a method for specifying a position, a terminal device, an autonomous device, and a program.

2. Description of the Related Art

An autonomous robot is known as one of autonomous devices that move autonomously. In order to move an autonomous robot, a user specifies a destination for the autonomous robot using a remote control or the like.

See, for example, Japanese Patent No. 5221939.

SUMMARY

In Japanese Patent No. 5221939, however, further improvements need to be made.

In one general aspect, the techniques disclosed here feature a method for controlling an autonomous device that moves in two dimensions using a controller. The method includes obtaining, at a first position, which is a destination of the autonomous device, a first image including a target above the first position; calculating, from the first image, first feature values indicating certain characteristics of the first image; referring to map information indicating correspondences between coordinate information indicating coordinates of defined positions included in a movement area of the autonomous device and second feature values, which are calculated from second images and indicate certain characteristics of the second images, the second images being obtained by capturing, at the defined positions, images of scenes above the defined positions, and identifying, by referring to the map information, a second position corresponding to second feature values having at least a predetermined degree of correspondence to the first feature values; generating a command for moving the autonomous device to the second position on the basis of coordinate information corresponding to the second position; and transmitting the command to the autonomous device.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 9 is a diagram illustrating an example of map information accumulated in a map database;

DETAILED DESCRIPTION

Figure 1:
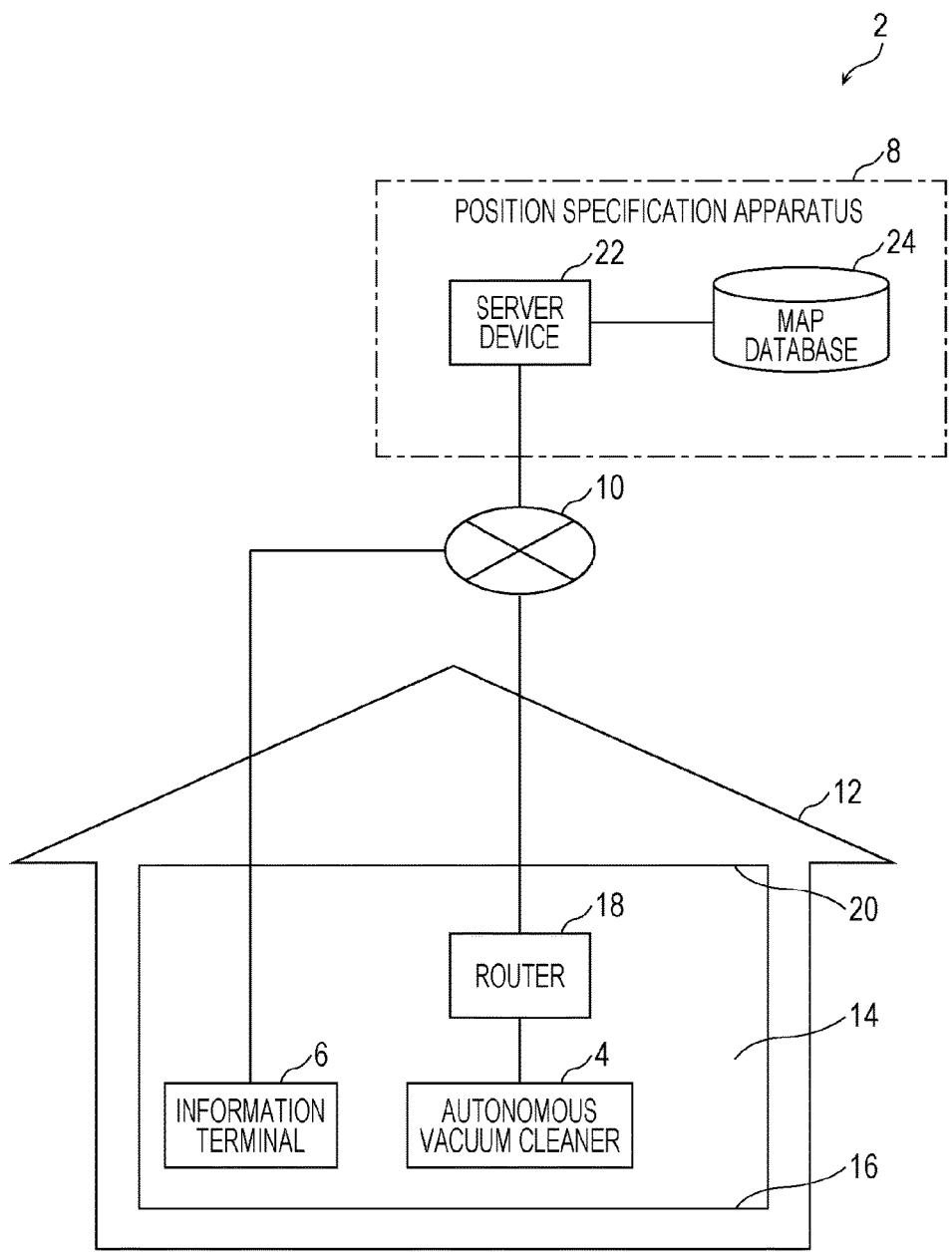
FIG. 1 is a block diagram schematically illustrating the overall configuration of a system for achieving a method for specifying a position according to an embodiment.

Underlying Knowledge Forming Basis of Present Disclosure

With the technique described in Japanese Patent No. 5221939, a user can instruct an autonomous robot to move to a desired position by selecting the desired position among a plurality of positions registered in advance as destinations of the autonomous robots. With such an autonomous robot, however, it is difficult for the user to instruct the autonomous robot to move to a position other than the plurality of positions registered in advance.

The present inventor has arrived at the following improvement measures.

(1) A method according to an aspect of the present disclosure is a method for controlling an autonomous device that moves in two dimensions using a controller. The method includes obtaining, at a first position, which is a destination of the autonomous device, a first image including a target above the first position; calculating, from the first image, first feature values indicating certain characteristics of the first image; referring to map information indicating correspondences between coordinate information indicating coordinates of defined positions included in a movement area of the autonomous device and second feature values, which are calculated from second images and indicate certain characteristics of the second images, the second images being obtained by capturing, at the defined positions, images of scenes above the defined positions, and identifying, by referring to the map information, a second position corresponding to second feature values having at least a predetermined degree of correspondence to the first feature values; generating a command for moving the autonomous device to the second position on the basis of coordinate information corresponding to the second position; and transmitting the command to the autonomous device.

According to this aspect, the user can easily instruct the autonomous device to move to an arbitrary position (or a position near the arbitrary position) through a simple operation in which the user captures an image of a target at the arbitrary position.

(2) In the aspect, the second feature values, calculated from the second images, may include one second feature value corresponding to a plurality of feature points included in each of the second images.

According to this aspect, the second position can be identified more accurately.

(3) In the aspect, the movement area may include a floor of a defined area, the target may include a ceiling of the defined area, and the second images may be captured by the autonomous device moving on the floor such that the second images include the ceiling.

According to this aspect, the autonomous device can generate map information.

(4) In the aspect, the map information may be created by the autonomous device using simultaneous localization and mapping.

According to this aspect, map information can be easily generated through simultaneous localization and mapping (SLAM).

(5) In the aspect, the first image may be captured by an image capture device connected to the autonomous device through a network.

According to this aspect, a target image can be captured at an arbitrary position using the image capture device.

(6) In the aspect, the method may further include capturing, by a first camera of the image capture device, a scene in a first direction, and capturing, by a second camera of the image capture device, a scene in a second direction, which is opposite the first direction. The first image may be an image captured by the second camera at the first position with the first camera directed to the first position.

According to this aspect, for example, when a ceiling of a room is captured by the first camera as a target image, a floor of the room viewed from the second camera can be displayed on a display. The user, therefore, can intuitively determine a position to be cleaned by the autonomous device.

(7) In the aspect, the method may further include providing a display to the image capture device, and displaying, on the display information indicating the second position.

According to this aspect, for example, the user can understand that the second position has been identified by taking a look at information displayed on the display of the image capture device.

(8) In the aspect, the first feature values and the second feature values may be calculated using one of following algorithms: oriented features from accelerated segment test and rotated binary robust independent elementary features, scale-invariant feature transform, and speeded up robust features.

According to this aspect, the second feature values can be easily calculated using an algorithm such as ORB, scale-invariant feature transform (SIFT), or speeded up robust features (SURF).

(9) In the aspect, the movement area may include a floor of a room. The autonomous devices may be an autonomous vacuum cleaner that cleans the floor while autonomously moving on the floor.

(10) A terminal device according to an aspect of the present disclosure is a terminal device that controls an autonomous device that moves in two dimensions. The terminal device includes a camera; a display; and a processor. The processor causes, at a first position, which is a destination of the autonomous device, the camera to capture a first image including a target above the first position, receives information indicating a second position identified on the basis of map information indicating correspondences between first feature values, which are calculated from the first image and indicate certain characteristics of the first image, and second feature values, which are calculated from second images and indicate certain characteristics of the second images, the second images being obtained at defined positions by capturing images of scenes above the defined positions, the second position corresponding to second feature values having at least a predetermined degree of correspondence to the first feature values, and displays the information on the display.

According to this aspect, the user can easily instruct the autonomous device to move to an arbitrary position (or a position near the arbitrary position) through a simple operation in which the user captures an image of a target at the arbitrary position.

(11) In the aspect, the processor may transmit the first image to a server connected to the terminal device through a network. The server may identify the second position. The processor may receive the information from the server.

It should be noted that these general or specific aspects may be implemented as a system, a method, an integrated circuit, a computer program, a computer-readable recording medium such as a compact disc read-only memory (CD-ROM), or any selective combination thereof.

An embodiment will be specifically described hereinafter with reference to the drawings.

The following embodiment is a general or specific example. Values, shapes, materials, components, arrangement positions and connection modes of the components, steps, the order of the steps, and the like are examples, and do not limit the present disclosure. Among the components described in the following embodiment, ones not described in the independent claims, which define broadest concepts, will be described as arbitrary components.

Embodiment

1. Overall Configuration of System

First, the overall configuration of a system 2 that achieves a method for specifying a position according to an embodiment will be described with reference to FIG. 1. FIG. 1 is a block diagram schematically illustrating the overall configuration of the system 2 that achieves the method for specifying a position according to the present embodiment.

As illustrated in FIG. 1, the system 2 according to the present embodiment includes an autonomous vacuum cleaner 4 (an example of an autonomous device), an information terminal 6 (an example of an image capture device), and a position specification apparatus 8. The autonomous vacuum cleaner 4, the information terminal 6, and the position specification apparatus 8 are connected to each other through the Internet 10 (an example of a network).

The autonomous vacuum cleaner 4 is a robotic vacuum cleaner that autonomously moves while cleaning a floor 16 (an example of a movement area) of a room 14 in a building 12 such as a house. The autonomous vacuum cleaner 4 observes the room 14 using a camera or a sensor such as a laser range finder and autonomously determines a route to be taken thereby to clean the floor 16 of the room 14. The autonomous vacuum cleaner 4 is connected to the Internet 10 through a router 18. The room 14 herein may be a section in the building 12 or may be a plurality of sections in the building 12.

The information terminal 6 is a mobile terminal, such as a smartphone, including a user interface for enabling a user to perform operations. The user interface of the information terminal 6 may be a touch panel, a speech recognition system, a gesture recognition system, or the like. The information terminal 6 has a function of capturing an image. As described later, when the user desires to make the autonomous vacuum cleaner 4 clean an arbitrary first position in the room 14, the user captures an image (an example of a target image) of a ceiling 20 (an example of a target) (hereinafter also referred to as a "ceiling image") at the first position using the information terminal 6. The information terminal 6 transmits the captured ceiling image to the position specification apparatus 8 through the Internet 10.

The position specification apparatus 8 identifies a second position corresponding to the first position on the basis of the ceiling image received from the information terminal 6 and instructs the autonomous vacuum cleaner 4 to move to the identified second position.

The position specification apparatus 8 includes a server device 22 and a map database 24 (an example of a storage unit). The server device 22 is, for example, a physical or virtual computer provided in a cloud. The map database 24 is, for example, a database in which map information (described later) collected from an autonomous vacuum cleaner 4 used in each household is accumulated.

The components of the system 2 will be described in detail hereinafter.

2. Configuration of Autonomous Vacuum Cleaner

Figure 2:
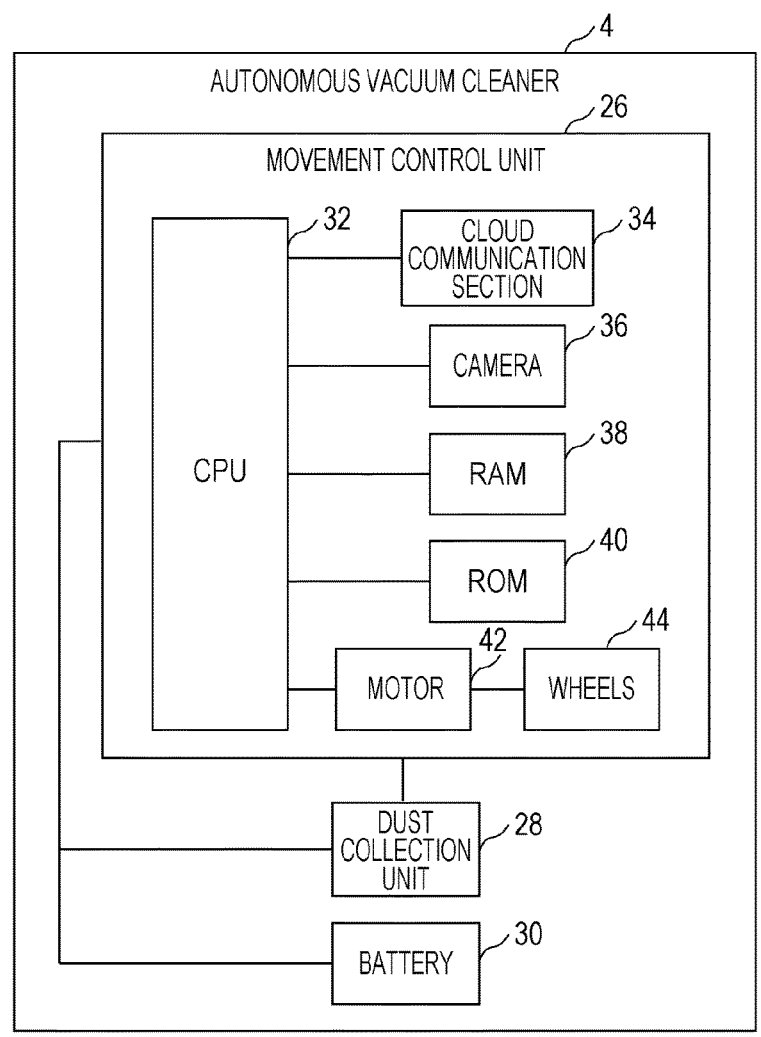
FIG. 2 is a block diagram illustrating the hardware configuration of an autonomous vacuum cleaner according to the embodiment.

The hardware configuration of the autonomous vacuum cleaner 4 will be described hereinafter with reference to FIG. 2. FIG. 2 is a block diagram illustrating the hardware configuration of the autonomous vacuum cleaner 4 according to the present embodiment.

As illustrated in FIG. 2, the autonomous vacuum cleaner 4 includes, as hardware components, a movement control unit 26 that controls the movement thereof, a dust collection unit 28 that collects dust and the like on the floor 16 of the room 14 (refer to FIG. 1), and a battery 30 that supplies power to the movement control unit 26 and the dust collection unit 28.

The movement control unit 26 includes a central processing unit (CPU) 32, a cloud communication section 34, a camera 36, a random-access memory (RAM) 38, a read-only memory (ROM) 40, a motor 42, and wheels 44.

The CPU 32 is a processing unit that executes movement control software. The cloud communication section 34 is a communication module for performing wireless communication such as Wi-Fi (registered trademark) or Bluetooth (registered trademark). The camera 36 is a camera module that captures an image of the ceiling 20 (hereinafter also referred to as a "ceiling image") of the room 14 in which the autonomous vacuum cleaner 4 is arranged. The camera 36 is directed vertically upward, for example, in order to capture an image of the ceiling 20 of the room 14. The RAM 38 is a volatile memory storing data obtained while the movement control software is being executed. The ROM 40 is a non-volatile memory storing the movement control software and map information (described later). The motor 42 moves the autonomous vacuum cleaner 4 forward or backward or rotates the autonomous vacuum cleaner 4 by operating the wheels 44.

The movement control unit 26 and the dust collection unit 28 may be provided on two independent boards, or may be provided on the same board.

Figure 3:
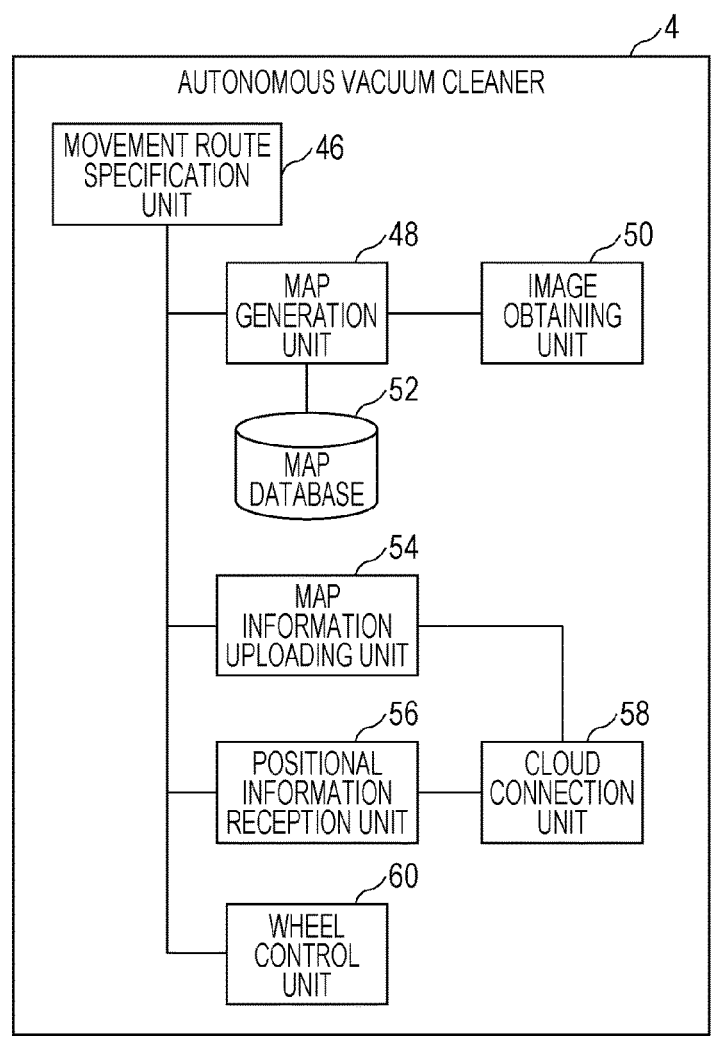
FIG. 3 is a block diagram illustrating the functional configuration of the autonomous vacuum cleaner according to the embodiment.

Next, a functional configuration for achieving the movement control software of the autonomous vacuum cleaner 4 will be described with reference to FIG. 3. FIG. 3 is a block diagram illustrating the functional configuration of the autonomous vacuum cleaner 4 according to the present embodiment.

As illustrated in FIG. 3, the autonomous vacuum cleaner 4 includes, as functional components, a movement route specification unit 46, a map generation unit 48, an image obtaining unit 50, a map database 52, a map information uploading unit 54, a positional information reception unit 56, a cloud connection unit 58, and a wheel control unit 60.

The movement route specification unit 46 is a software module for specifying a movement route of the autonomous vacuum cleaner 4 for the wheel control unit 60. More specifically, the movement route specification unit 46 calculates, on the basis of plan information (described later) regarding the building 12 (refer to FIG. 1) generated by the map generation unit 48 and a current position and a movement direction of the autonomous vacuum cleaner 4, section information regarding the building 12 in which cleaning has not been completed. As a result, the movement route specification unit 46 determines an optimal movement route in the building 12 and specifies a destination and a movement speed of the autonomous vacuum cleaner 4 or the like for the wheel control unit 60.

The map generation unit 48 estimates a plan of the building 12 in which the autonomous vacuum cleaner 4 is arranged and the current position and the movement direction of the autonomous vacuum cleaner 4 in the building 12 on the basis a ceiling image obtained by the image obtaining unit 50. As a result, the map generation unit 48 generates plan information indicating the plan of the building 12 and map information and stores these pieces of information in the map database 52. SLAM, for example, is used in the estimation.

Although a method in which the estimation is performed using only a ceiling image captured by the camera 36 will be described in the present embodiment, the estimation may be performed using a result of detection performed by a gyro sensor (not illustrated) or a wheel encoder (not illustrated) included in the autonomous vacuum cleaner 4 as well as a ceiling image, instead. In this case, the accuracy of the estimation improves.

The image obtaining unit 50 is a software module that obtains a ceiling image captured by the camera 36.

The map database 52 is a database in which plan information and map information generated by the map generation unit 48 and the like are accumulated. The data structure of the map information will be described in detail later.

The map information uploading unit 54 is a software module that transmits the map information stored in the map database 52 to the server device 22 through the cloud connection unit 58.

The positional information reception unit 56 is a software module that receives, from the server device 22 through the cloud connection unit 58, positional information regarding a position (that is, a second position, which is a destination of the autonomous vacuum cleaner 4) that the user desires to clean. The positional information reception unit 56 outputs the positional information received from the server device 22 to the movement route specification unit 46. As a result, the movement route specification unit 46 outputs, to the wheel control unit 60, an instruction to move the autonomous vacuum cleaner 4 to the second position indicated by the received positional information.

The cloud connection unit 58 is a software module for performing bidirectional communication between the server device 22 and the autonomous vacuum cleaner 4 using the cloud communication section 34.

The wheel control unit 60 moves the autonomous vacuum cleaner 4 to a certain position by controlling the motor 42 on the basis of an instruction from the movement route specification unit 46.

Figure 4:
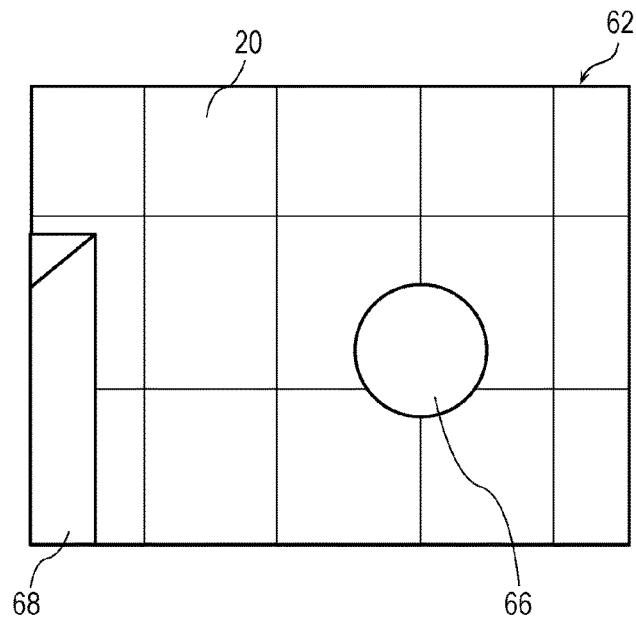
FIG. 4 is a diagram illustrating an example of a ceiling image obtained by an image obtaining unit.
Figure 5:
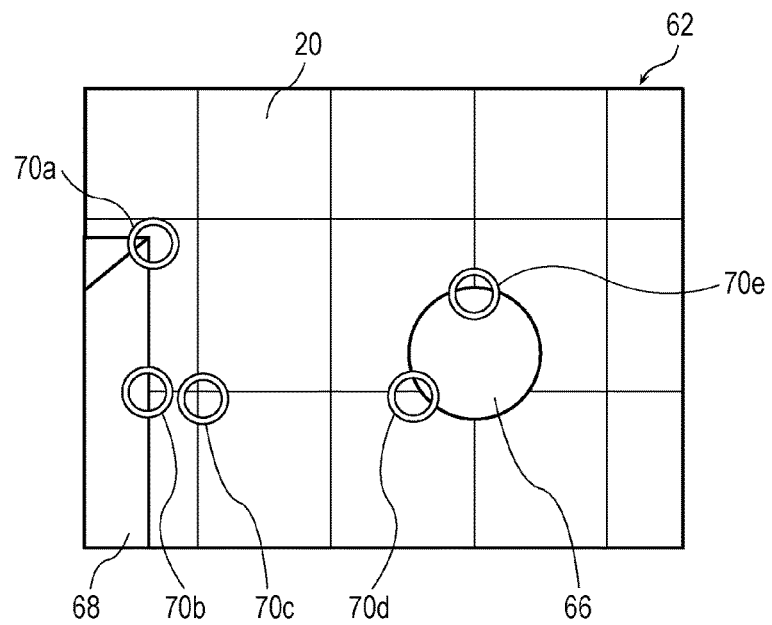
FIG. 5 is a diagram illustrating an example of feature points extracted from the ceiling image illustrated in FIG. 4.
Figure 6:
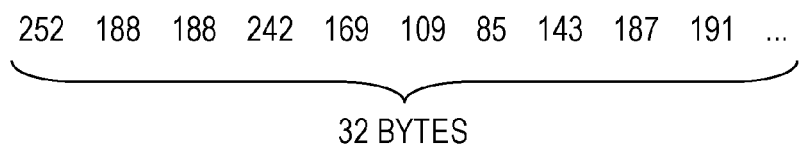
FIG. 6 is a diagram illustrating an example of feature values calculated using an oriented features from accelerated segment test (FAST) and rotated binary robust independent elementary features (BRIEF) (ORB) algorithm.
Figure 7:
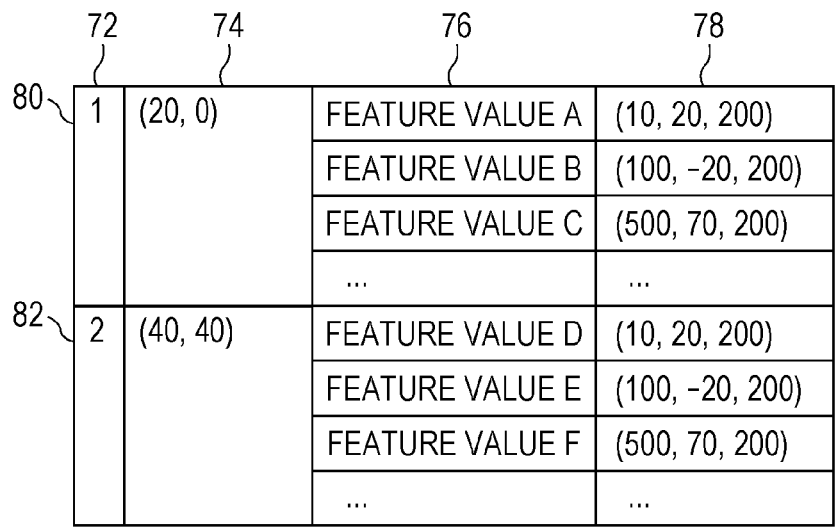
FIG. 7 is a diagram illustrating an example of map information generated by a map generation unit.

The map information generated by the map generation unit 48 will be described with reference to FIGS. 4 to 7. FIG. 4 is a diagram illustrating an example of a ceiling image 62 obtained by the image obtaining unit 50. FIG. 5 is a diagram illustrating an example of feature points 70a to 70e extracted from the ceiling image 62 illustrated in FIG. 4. FIG. 6 is a diagram illustrating an example of a feature value calculated using an ORB algorithm. FIG. 7 is a diagram illustrating an example of the map information generated by the map generation unit 48.

As illustrated in FIG. 4, the ceiling image 62 obtained by the image obtaining unit 50 includes, for example, the ceiling 20 of the room 14, a lighting device 66 provided on the ceiling 20, and a piece of furniture 68 provided on the floor 16 of the room 14. As illustrated in FIG. 5, the map generation unit 48 extracts, from among a plurality of pixels included in the ceiling image 62, the feature points 70a to 70e, which are pixels whose luminance values and colors change significantly compared to the other pixels. The map generation unit 48 extracts the plurality of feature points 70a to 70e from the single ceiling image 62. An algorithm such as FAST may be used for the extraction of the feature points 70a to 70e.

The map generation unit 48 calculates information called a "feature value" for each feature point in order to distinguish a feature point from the other feature points. An algorithm such as ORB, SIFT, or SURF may be used for the calculation of feature values. As illustrated in FIG. 6, if ORB is used, for example, the map generation unit 48 calculates a feature value as a 32-byte binary string.

The map generation unit 48 can estimate a movement distance and a movement direction of the autonomous vacuum cleaner 4 between a first image capture position and a second image capture position, which is different from the first image capture position, on the basis of a first ceiling image captured at the first image capture position and a second ceiling image captured at the second image capture position using feature values calculated as above. More specifically, the map generation unit 48 extracts a pair of feature points whose feature values match from a plurality of feature points included in the first and second ceiling images and calculates the movement distance and the movement direction of the autonomous vacuum cleaner 4 by triangulation on the basis of a difference between positions of the extracted pair of feature points in the ceiling images. Furthermore, the map generation unit 48 is capable of calculating coordinates of feature points included in the ceiling images by triangulation on the basis of on the basis of results of the estimation of the movement distance and the movement direction of the autonomous vacuum cleaner 4 between the first and second image capture positions. The map generation unit 48 regularly obtains a new ceiling image from the image obtaining unit 50 and repeats the above estimation in order to calculate a position of the autonomous vacuum cleaner 4 at a time when the ceiling image is captured and coordinates of feature points observed from the position.

As described above, the map generation unit 48 generates map information on the basis calculated feature values. As illustrated in FIG. 7, in the map information, positional information regarding a position in the room 14 in the building 12 and feature values calculated from a ceiling image captured at the position are associated with each other. FIG. 7 illustrates a table indicating two pieces of map information.

In the table illustrated in FIG. 7, a column 72 indicates identifiers for identifying ceiling images obtained by the image obtaining unit 50. An identifier is provided in a consecutive number, for example, each time the image obtaining unit 50 obtains a new image. That is, the identifiers indicated in the column 72 are used for identifying map information. A column 74 indicates two-dimensional coordinates (an example of positional information) in an XY coordinate system (an example of a certain coordinate system) indicating the position (estimated position) of the autonomous vacuum cleaner 4 at a time when each ceiling image is captured. A column 76 indicates feature values (an example of first feature values) of feature points included in each ceiling image. A column 78 indicates three-dimensional coordinates (estimated coordinates) in an XYZ coordinate system indicating a position of each feature point. In the XY and XYZ coordinate systems, a charger 102 (refer to FIG. 11) is located at an origin. Alternatively, the column 78 may indicate two-dimensional coordinates in an XY coordinate system. Rows 80 and 82 each indicate map information (hereinafter also referred to as a "key frame") in which coordinates of a position of the autonomous vacuum cleaner 4 and feature values and coordinates of feature points included in a ceiling image captured at the position are associated with each other.

In the example illustrated in FIG. 7, map information having an identifier "1" indicates that the position of the autonomous vacuum cleaner 4 is (X, Y)=(20, 0), a position of a feature point A is (X, Y, Z)=(10, 20, 200), a position of a feature point B is (X, Y, Z)=(100, −20, 200), and a position of a feature point C is (X, Y, Z)=(500, 70, 200).

3. Configuration of Position Specification Apparatus

Figure 8:
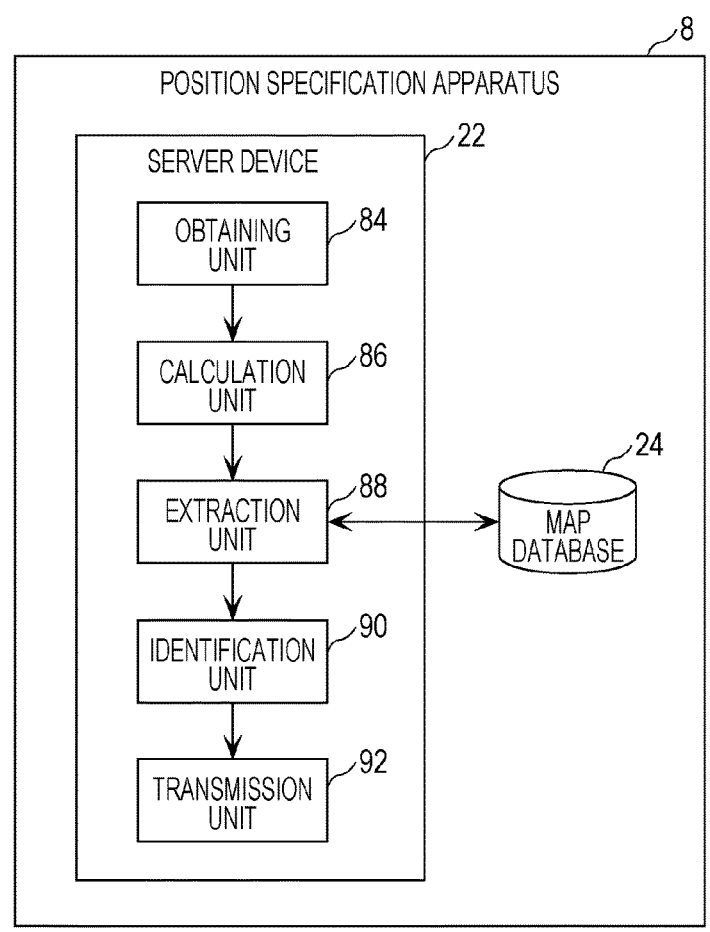
FIG. 8 is a block diagram illustrating the functional configuration of a position specification apparatus according to the embodiment.

Next, the functional configuration of the position specification apparatus 8 will be described with reference to FIGS. 8 and 9. FIG. 8 is a block diagram illustrating the functional configuration of the position specification apparatus 8 according to the present embodiment. FIG. 9 is a diagram illustrating an example of the map information accumulated in the map database 24.

As illustrated in FIG. 8, the server device 22 of the position specification apparatus 8 includes, as functional components, an obtaining unit 84, a calculation unit 86, an extraction unit 88, an identification unit 90, and a transmission unit 92.

The obtaining unit 84 obtains an image of the ceiling 20 at the first position in the room 14 (refer to FIG. 1) captured by the information terminal 6.

The calculation unit 86 calculates second feature values from a ceiling image obtained by the obtaining unit 84.

The extraction unit 88 extracts, from the map database 24, map information including first feature values corresponding to the second feature values.

The identification unit 90 identifies the second position corresponding to the first position on the basis of map information extracted by the extraction unit 88. The identification unit 90 identifies, as the second position, two-dimensional coordinates indicating the second position in the XY coordinate system.

The transmission unit 92 transmits, to the autonomous vacuum cleaner 4, an instruction to move the autonomous vacuum cleaner 4 to the second position identified by the identification unit 90.

As illustrated in FIG. 9, the map database 24 of the position specification apparatus 8 is a database of map information based on structured query language (SQL) or a relational database (RDB).

FIG. 9 illustrates a table including two pieces of map information. In the table illustrated in FIG. 9, a column 94 indicates a device identifier (ID), which is an identifier for identifying an autonomous vacuum cleaner 4 owned by each household. A media access control (MAC) address provided for the cloud communication section 34 or a number provided by a manufacturer of the autonomous vacuum cleaner 4 in accordance with a certain rule, for example, may be used as a device ID. Columns 96 are the same as the columns 72, 74, 76, and 78, and description thereof is omitted. The server device 22 thus manages map information generated by the autonomous vacuum cleaner 4 owned by each household and the device ID of the autonomous vacuum cleaner 4 that are associated with each other.

4. Configuration of Information Terminal

Figure 10:
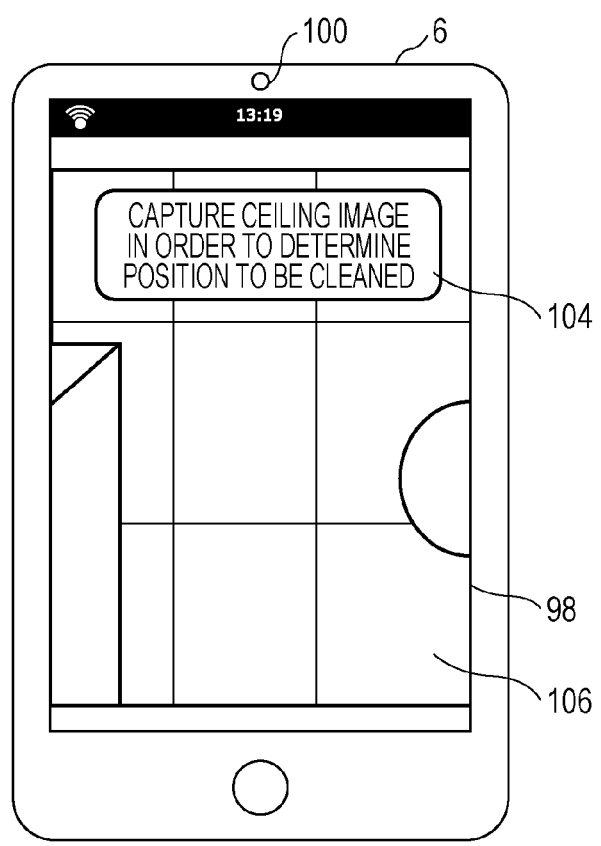
FIG. 10 is a diagram illustrating a front surface of an information terminal according to the embodiment.

Next, the configuration of the information terminal 6 will be described with reference to FIG. 10. FIG. 10 is a diagram illustrating a front surface of the information terminal 6 according to the present embodiment.

As illustrated in FIG. 10, the information terminal 6 includes a display unit 98 and an in-camera 100 (an example of a first image capture unit).

The display unit 98 is arranged on the front surface of the information terminal 6. The display unit 98 is a liquid crystal panel, for example, and displays various screens. The display unit 98 is also a touch panel as a user interface that receives various instructions from the user.

The in-camera 100 is arranged on the front surface of the information terminal 6 and captures a scene in a front direction (an example of a first direction) of the information terminal 6.

5. Operation of System 5-1. Outline of Operation of System

Figure 11:
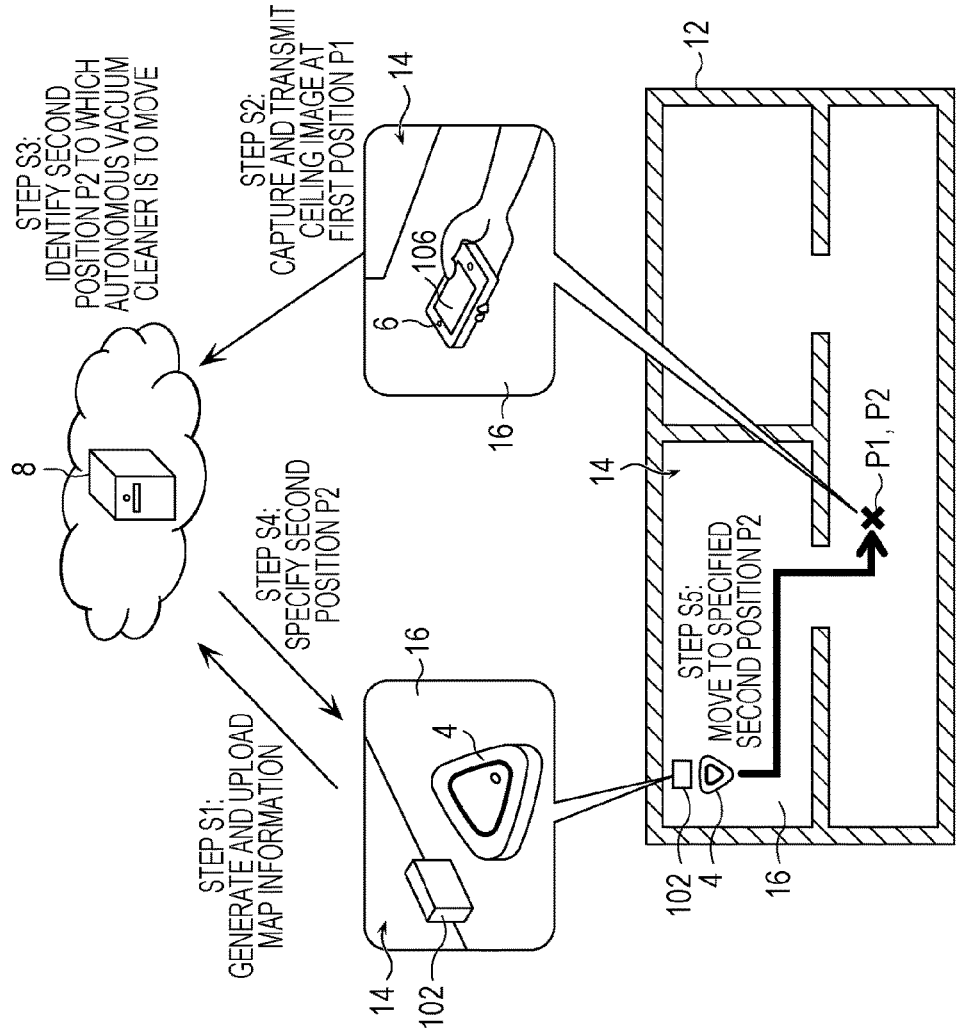
FIG. 11 is a diagram illustrating an outline of the operation of a system according to the embodiment.

Next, an outline of the operation of the system 2 will be described with reference to FIG. 11. FIG. 11 is a diagram illustrating the outline of the operation of the system 2 according to the present embodiment.

As illustrated in FIG. 11, first, the autonomous vacuum cleaner 4 captures an image of the ceiling 20 (refer to FIG. 1) of the room 14 while moving on the floor 16 of the room 14 in the building 12, and generates map information on the basis of the captured ceiling image. The autonomous vacuum cleaner 4 uploads the generated map information to the position specification apparatus 8 through the Internet 10 (refer to FIG. 1) (S1).

If the user desires to make the autonomous vacuum cleaner 4 clean an arbitrary first position P1 in the room 14, the user captures an image of the ceiling 20 at the first position P1 using the information terminal 6. The information terminal 6 transmits the captured ceiling image to the position specification apparatus 8 through the Internet 10 (S2).

The position specification apparatus 8 then identifies a second position P2 corresponding to the first position P1 on the basis of the ceiling image received from the information terminal 6 (S3). The identified second position P2 may be the same position as the first position P1 or may be a position near the first position P1.

The position specification apparatus 8 then instructs the autonomous vacuum cleaner 4 to move to the identified second position P2 (S4).

The autonomous vacuum cleaner 4 then moves, on the basis of the instruction from the position specification apparatus 8, to the second position P2 from the charger 102 arranged in the room 14 (S5).

The processing in steps S1 to S4 will be described in detail hereinafter.

5-2. Processing in Step S1

Figure 12:
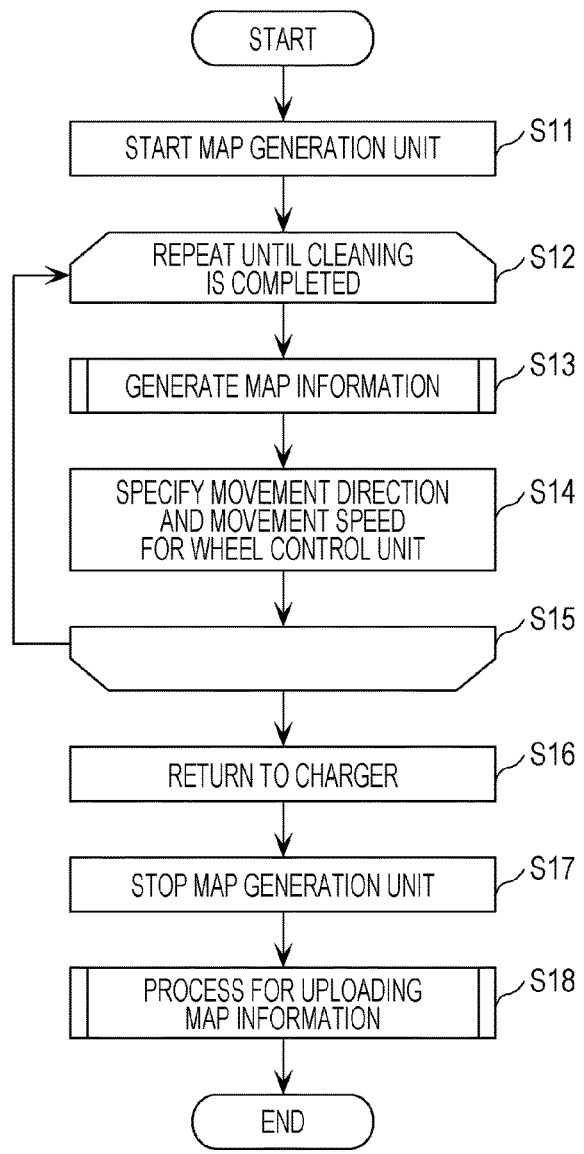
FIG. 12 is a flowchart illustrating a process performed by the autonomous vacuum cleaner to generate and upload map information according to the embodiment.
Figure 13:
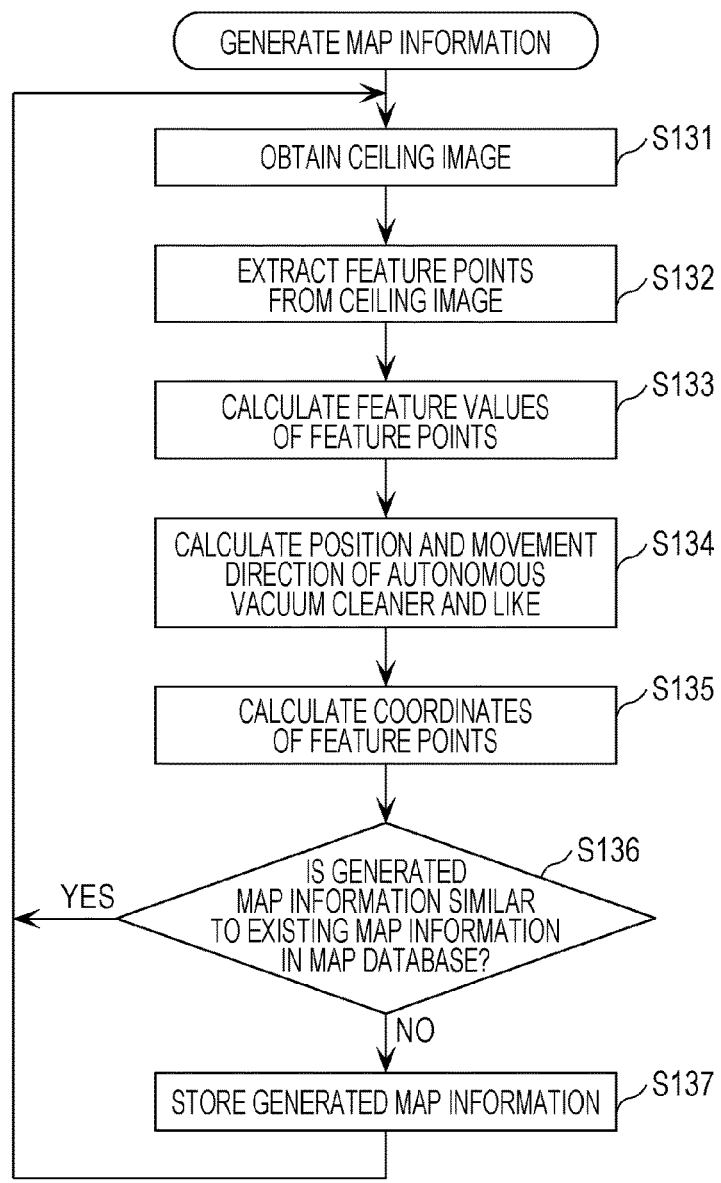
FIG. 13 is a flowchart specifically illustrating step S13 illustrated in FIG. 12.
Figure 14:
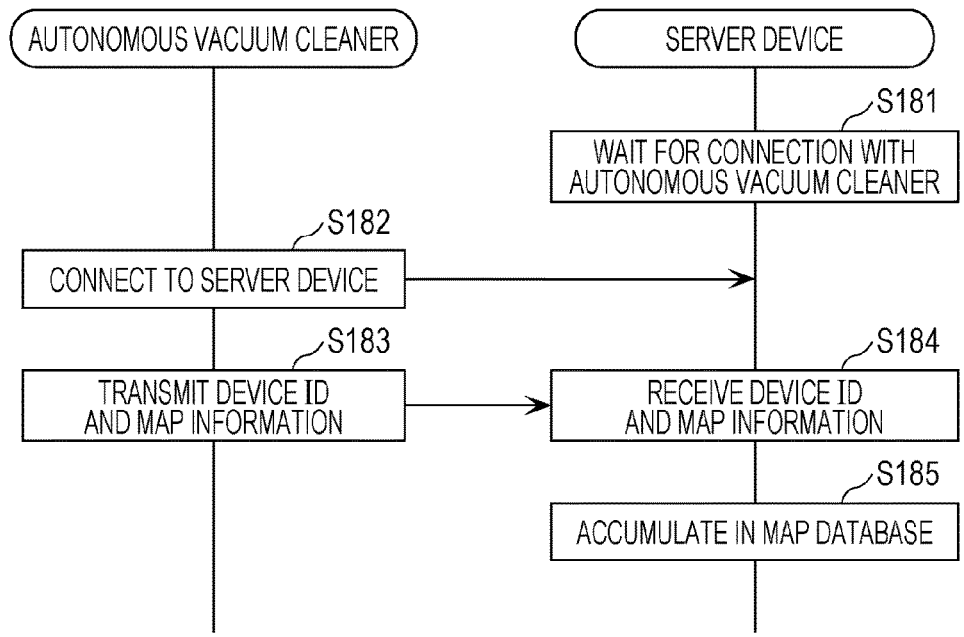
FIG. 14 is a sequence diagram specifically illustrating step S18 illustrated in FIG. 12.

The processing in step S1 illustrated in FIG. 11 will be described in detail with reference to FIGS. 12 to 14. FIG. 12 is a flowchart illustrating a process performed by the autonomous vacuum cleaner 4 to generate and upload map information according to the present embodiment. FIG. 13 is a flowchart specifically illustrating step S13 illustrated in FIG. 12. FIG. 14 is a sequence diagram specifically illustrating step S18 illustrated in FIG. 12.

If the user presses a main button of the autonomous vacuum cleaner 4 or a remote control button, for example, the autonomous vacuum cleaner 4 is instructed to start cleaning. The autonomous vacuum cleaner 4 cleans the floor 16 of the room 14 while moving along a certain movement route. During the movement, the autonomous vacuum cleaner 4 captures images of the ceiling 20 of the room 14 using the camera 36.

As illustrated in FIG. 12, the movement route specification unit 46 starts the map generation unit 48 (S11). Next, the autonomous vacuum cleaner 4 repeats processing in steps S13 and S14 until the cleaning is completed (S12 to S15). The cleaning is completed, for example, a) when it has been determined that there is no uncleaned in a plan indicated by plan information generated by the map generation unit 48, b) when the user has instructed the autonomous vacuum cleaner 4 to stop the cleaning (pressing of the main button or the remote control button), or c) when the remaining life of the battery 30 has fallen equal to or below a certain value.

In step S13, the map generation unit 48 generates map information by estimating the current position of the autonomous vacuum cleaner 4 and coordinates of feature points included in a ceiling image obtained from the image obtaining unit 50 on the basis of the ceiling image.

Here, the processing in step S13 will be specifically described with reference to FIG. 13. As illustrated in FIG. 13, the map generation unit 48 obtains a ceiling image from the image obtaining unit 50 (S131) and extracts feature points from the obtained ceiling image (S132). The map generation unit 48 then calculates feature values of the extracted feature points (S133).

The map generation unit 48 then calculates (estimates) a direction in which the autonomous vacuum cleaner 4 has moved, a distance by which the autonomous vacuum cleaner 4 has moved, and the current position of the autonomous vacuum cleaner 4 on the basis of the feature points included in the ceiling image obtained in step S131 and feature points included in a ceiling image obtained in a previous repetition of steps S12 to S15 (S134). The map generation unit 48 then calculates (estimates) coordinates of the feature points included in the ceiling image obtained in step S131 (S135). The map generation unit 48 thus generates map information.

The map generation unit 48 then determines whether existing map information accumulated in the map database 52 and the map information generated in step S135 are similar to each other (S136). At this time, if there are a certain ratio of pairs of feature points whose feature values match among the feature points included in the two pieces of map information, the map generation unit 48 determines that the two pieces of map information are similar to each other.

If the map generation unit 48 determines that the two pieces of map information are not similar to each other (NO in S136), the map generation unit 48 stores the generated map information in the map database 52 (S137) and repeats the processing in steps S131 to S136. If the map generation unit 48 determines that the two pieces of map information are similar to each other (YES in S136), on the other hand, the map generation unit 48 repeats the processing in steps S131 to S136 without storing the generated map information in the map database 52. As a result, the amount of data stored in the map database 52 can be reduced.

In FIG. 12, the movement route specification unit 46, after step S13, calculates a movement direction and a movement speed for the autonomous vacuum cleaner 4 from the current position and a destination of the autonomous vacuum cleaner 4 on the basis of the map information generated in step S13, and specifies the calculated movement direction and movement speed for the wheel control unit 60. As a result, the autonomous vacuum cleaner 4 moves in the specified movement direction at the specified movement speed.

If it is determined that the cleaning has been completed (S12 to S15), the autonomous vacuum cleaner 4 returns to the charger 102 (S16). The movement route specification unit 46 then stops the map generation unit 48 (S17) and performs a process for uploading the map information (S18).

Here, the processing in step S18 will be specifically described with reference to FIG. 14. As illustrated in FIG. 14, the server device 22 waits for a connection with the autonomous vacuum cleaner 4 owned by each household (S181). The map information uploading unit 54 of the autonomous vacuum cleaner 4 establishes a connection to the server device 22 through the cloud connection unit 58 (S182). A protocol such as hypertext transport protocol (HTTP) or WebSocket may be used for the connection between the map information uploading unit 54 and the server device 22. Alternatively, bidirectional or unidirectional authentication may be performed between the map information uploading unit 54 and the server device 22, and encrypted communication such as secure sockets layer (SSL) may be performed.

After the connection is established, the map information uploading unit 54 transmits the map information and the device ID of the autonomous vacuum cleaner 4 to the server device 22 (S183). The server device 22 receives the map information and the device ID from the map information uploading unit 54 (S184) and accumulates the map information and the device ID in the map database 24 (S185). The autonomous vacuum cleaner 4 owned by each household can thus upload the generated map information to the server device 22.

5-3. Processing in steps S2 to S5

Figure 15:
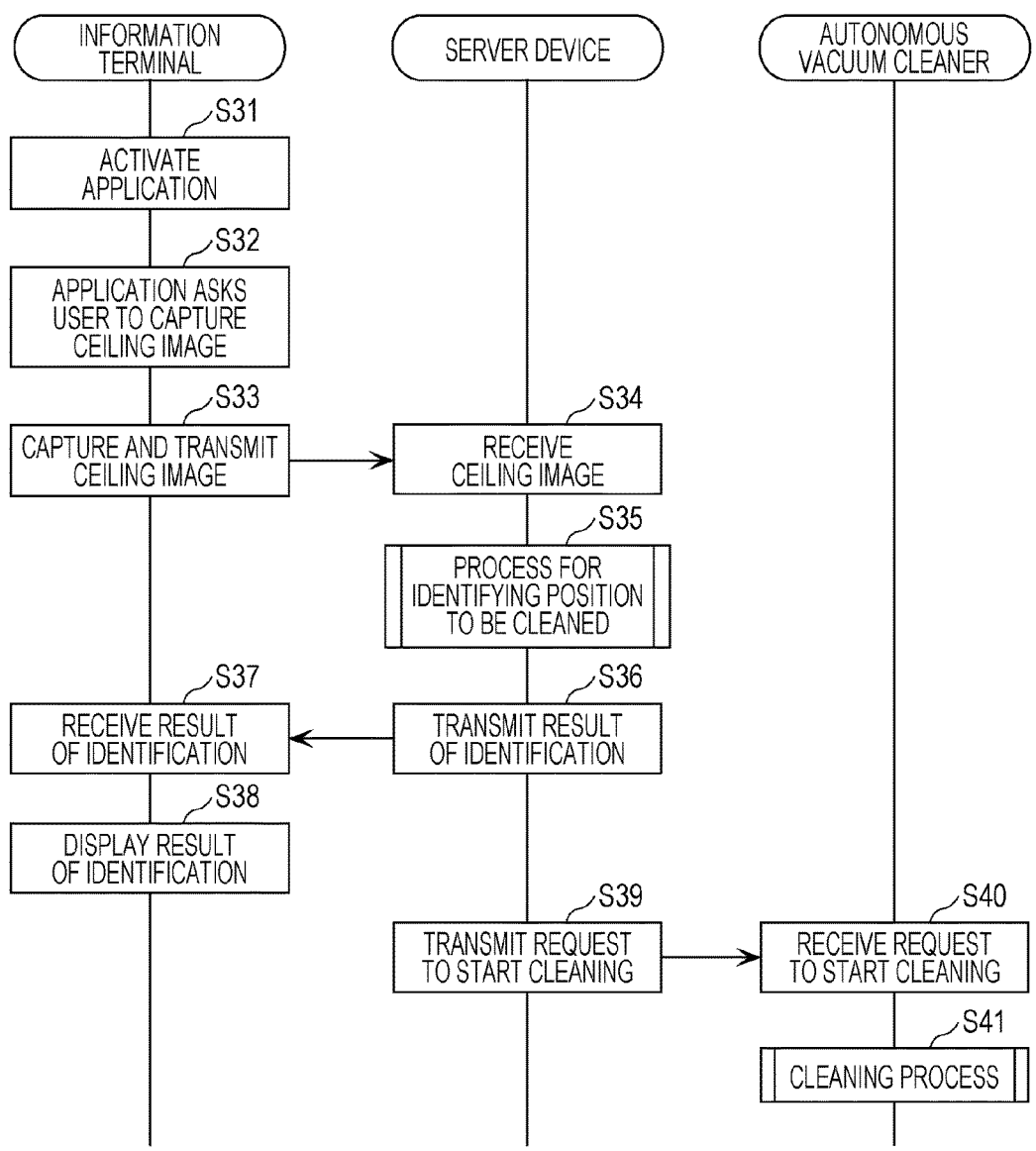
FIG. 15 is a sequence diagram illustrating a process for specifying a destination for the autonomous vacuum cleaner according to the embodiment.
Figure 16:
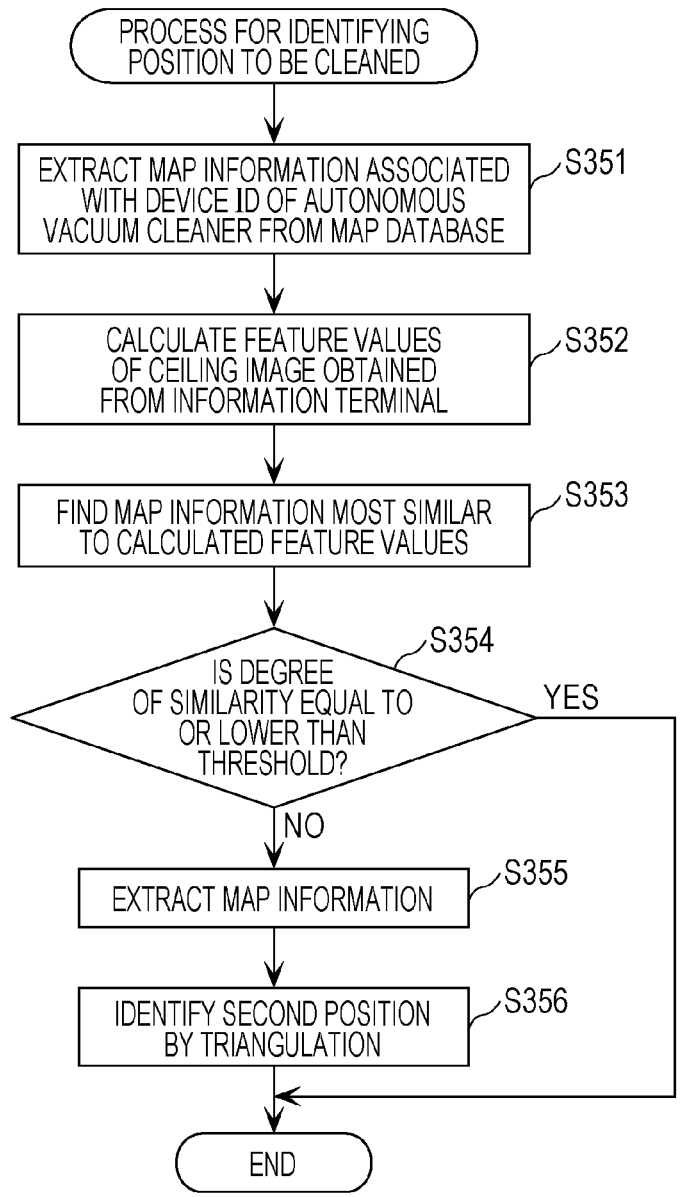
FIG. 16 is a flowchart specifically illustrating step S35 illustrated in FIG. 15.
Figure 17:
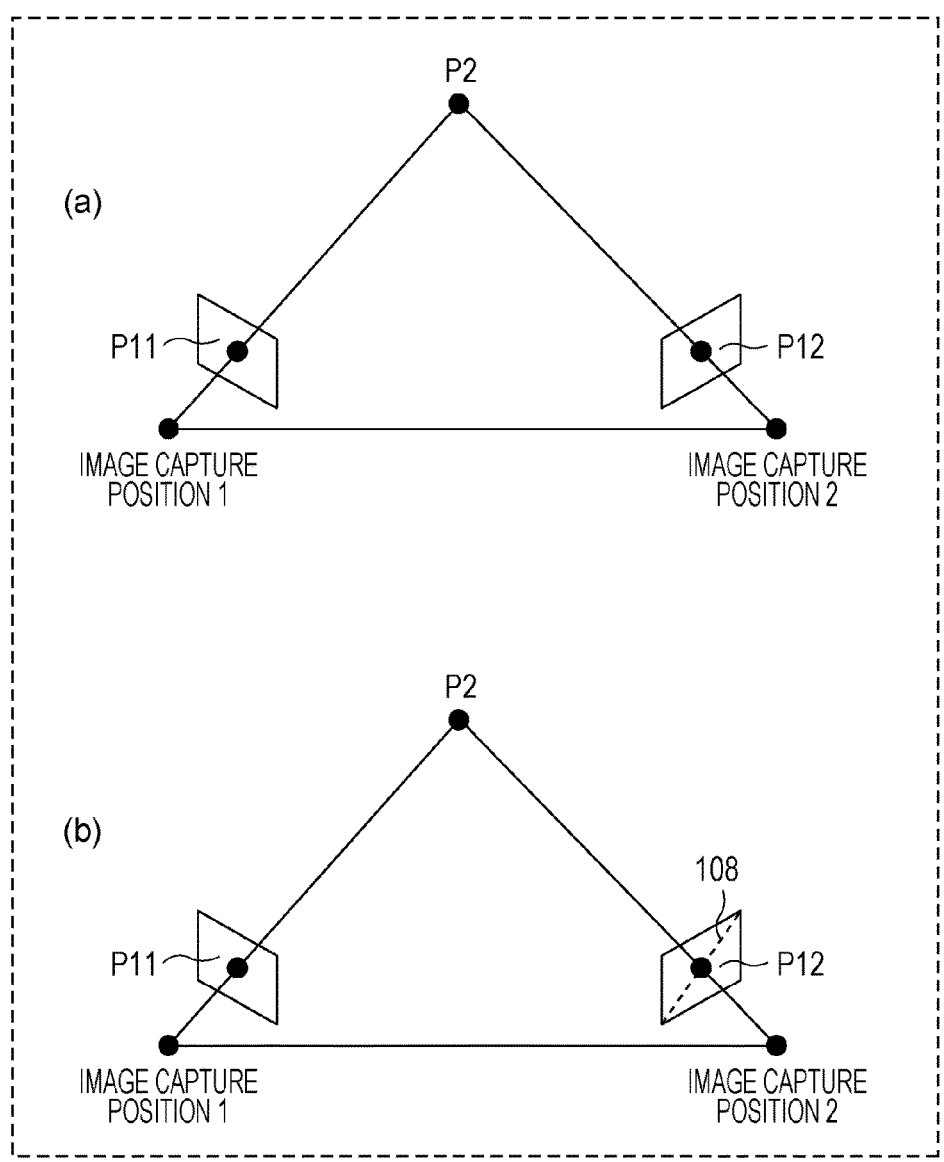
FIG. 17 is a diagram illustrating a method for identifying a second position by triangulation.
Figure 18:
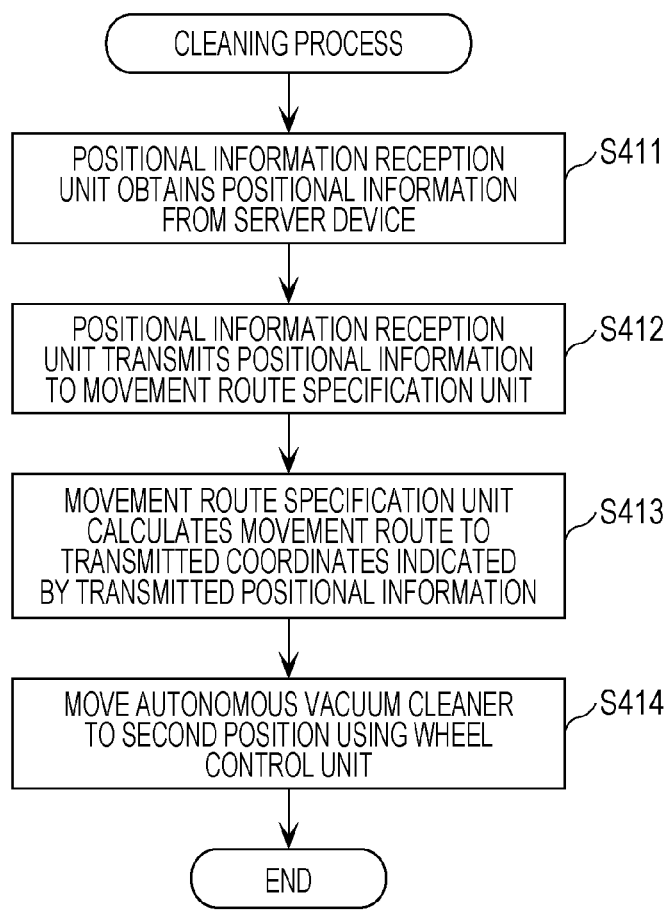
FIG. 18 is a flowchart specifically illustrating step S41 illustrated in FIG. 15.

Next, the processing in steps S2 to S5 illustrated in FIG. 11 will be described with reference to FIGS. 10 and 15 to 18. FIG. 15 is a sequence diagram illustrating a process for specifying a destination for the autonomous vacuum cleaner 4 according to the present embodiment. FIG. 16 is a flowchart specifically illustrating step S35 illustrated in FIG. 15. FIG. 17 is a diagram illustrating a method for identifying the second position P2 by triangulation. FIG. 18 is a flowchart specifically illustrating step S41 illustrated in FIG. 15.

As illustrated in FIG. 15, first, the user activates an application for specifying a position to be cleaned installed on the information terminal 6 (S31). The application then asks the user to capture an image of the ceiling 20 at a position to be cleaned (S32). At this time, as illustrated in FIG. 10, for example, the display unit 98 of the information terminal 6 displays a message box 104 asking the user to capture an image of the ceiling 20 at a position to be cleaned. The user holds the information terminal 6 with the in-camera 100 directed to the ceiling 20 (vertically upward) at the first position P1 (refer to FIG. 11) in the room 14 to be cleaned and captures a ceiling image 106 (refer to FIG. 10) using the in-camera 100 (S33). At this time, as illustrated in FIG. 10, the display unit 98 of the information terminal 6 displays the ceiling image 106 captured by the in-camera 100.

The user then operates the information terminal 6 to transmit the captured ceiling image 106 to the server device 22 along with the device ID of the autonomous vacuum cleaner 4 owned thereby (S33). It is to be noted that the user has read in advance a quick response (QR) code (registered trademark) or the like using the information terminal 6 to register the device ID of the autonomous vacuum cleaner 4 to the application.

The obtaining unit 84 of the server device 22 then obtains (receives) the ceiling image 106 from the information terminal 6 (S34). The server device 22 then performs a process for identifying a position to be cleaned on the basis of the received ceiling image 106 (S35).

Here, the processing in step S35 will be specifically described with reference to FIG. 16. As illustrated in FIG. 16, first, the extraction unit 88 of the server device 22 extracts, from the map database 24, all pieces of map information (key frames) associated with the device ID transmitted from the information terminal 6 (S351).

The calculation unit 86 of the server device 22 then calculates second feature values of feature points included in the ceiling image 106 transmitted from the information terminal 6 (S352). A method for calculating the second feature points is the same as that described in step S133 illustrated in FIG. 13.

The extraction unit 88 of the server device 22 then find, among the pieces of map information extracted from the map database 24 in step S351, a piece of map information including the first feature values most similar to the second feature values calculated in step S351 (S353).

The extraction unit 88 of the server device 22 then determines whether a degree of similarity between the second feature values calculated in step S352 and the first feature values included in the pieces of map information found in step S353 is equal to or lower than a certain threshold (e.g., 90%) (S354). If the degree of similarity exceeds the certain threshold (NO in S354), the pieces of map information found in step S353 are extracted (S355). If the degree of similarity is equal to or lower than the certain threshold (YES in S354), on the other hand, the process ends without extracting the pieces of map information found in step S353.

After step S355, the identification unit 90 of the server device 22 identifies the second position P2 by triangulation on the basis of pieces of positional information included in the pieces of map information extracted in step S355 (S356). As described above, the second position P2 is a two-dimensional coordinates indicating a position corresponding to the first position P1 in the XY coordinate system.

Here, the method for identifying the second position P2 by triangulation will be described with reference to FIG. 17. In FIG. 17(*a*), image capture positions 1 and 2 are each the center of a lens of the camera 36 at each position. A position P11 is coordinates of the second position P2 in a ceiling image captured at image capture position 1, and a position P12 is coordinates of the second position P2 in a ceiling image captured at image capture position 2. It is to be noted that map information regarding the ceiling images captured at image capture positions 1 and 2 are accumulated in the map database 24 in advance, and the attitude (direction and position) of the lens of the camera 36 at image capture positions 1 and 2 are known. The ceiling image captured at the first position P1 includes the same feature points as ones included in the ceiling images captured at image capture positions 1 and 2. First, by referring to the map information (refer to FIG. 9) accumulated in the map database 24, feature values and coordinates of the feature points included in the ceiling image captured at the first position P1 are identified, and then coordinates of image capture positions 1 and 2, at which the images including the feature points have been captured, are identified. Thereafter, as illustrated in FIG. 17(a), an intersection between a straight line connecting image capture position 1 and the position P11 and a straight line connecting image capture position 2 and the position P12 is identified as coordinates of the second position P2.

When coordinates of image capture position 1, the coordinates of the second position P2, and the attitude of the lens of the camera 36 at image capture position 1 are known, coordinates of image capture position 2 and the attitude of the lens of the camera 36 at image capture position 2 can be calculated in the following manner. As indicated by a broken line in FIG. 17(b), the straight line connecting image capture position 1 and the position P11 is projected onto the ceiling image captured at image capture position 2 as a straight epipolar line 108. The coordinates of image capture position 2 and the attitude of the lens of the camera 36 at image capture position 2 can be calculated on the basis of a geometric characteristic that the position P12 is observed on the epipolar line 108.

In FIG. 15, the server device 22, after step S35, transmits a result of the identification of a position to be cleaned (information regarding the identified second position) to the information terminal 6 (S36). The information terminal 6 receives the result of the identification from the server device 22 (S37) and displays the received result of the identification on the display unit 98 (S38). At this time, the display unit 98 displays, as the result of the identification, a message such as "Position to be cleaned identified". The user can understand that a position to be cleaned has been identified by taking a look at the result of the identification displayed on the display unit 98.

If the process for identifying a position to be cleaned fails in step S35, the display unit 98 may display the message box 104 (refer to FIG. 10) asking the user to capture an image of the ceiling 20 again. In this case, the processing in steps S32 to S35 is performed again.

The transmission unit 92 of the server device 22 then transmits a request to start cleaning to the autonomous vacuum cleaner 4 (S39). That is, the transmission unit 92 transmits an instruction to move the autonomous vacuum cleaner 4 to the identified second position P2 to the autonomous vacuum cleaner 4. The autonomous vacuum cleaner 4 then receives the request to start cleaning from the server device 22 (S40) and performs a cleaning process (S41).

The processing in step S41 will be specifically described with reference to FIG. 18. As illustrated in FIG. 18, the positional information reception unit 56 obtains positional information indicating the coordinates of the second position P2 from the server device 22 (S411). The positional information reception unit 56 then transmits the positional information to the movement route specification unit 46 (S412). The movement route specification unit 46 then calculates a movement route to the coordinates indicated by the transmitted positional information (S413). The movement route specification unit 46 then controls the wheel control unit 60 such that the autonomous vacuum cleaner 4 moves to the second position P2 (S414). If the remaining life of the battery 30 is equal to or shorter than a certain value, the movement route specification unit 46 may wait until the charger 102 supplies power to the battery 30 and then move the autonomous vacuum cleaner 4 to the second position P2.

6. Advantageous Effects

As described above, the user can easily instruct the autonomous vacuum cleaner 4 to move to an arbitrary position (or a position near the arbitrary position) to be cleaned through a simple operation in which the user captures an image of the ceiling 20 using the information terminal 6 at the arbitrary position.

Modifications

Figure 19:
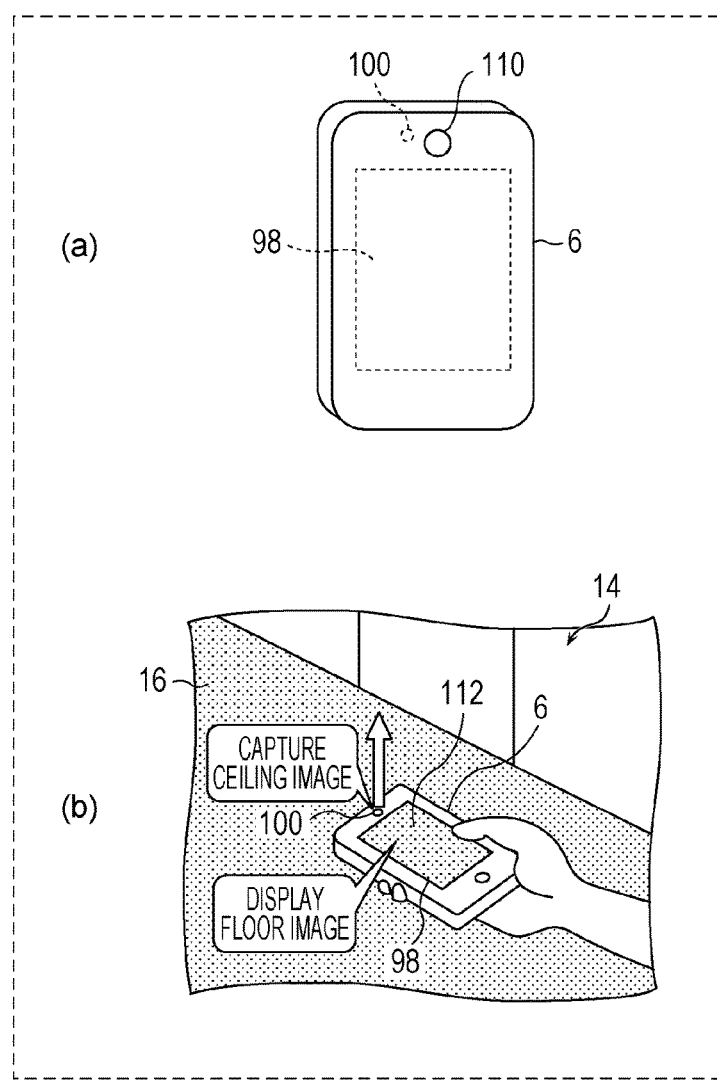
FIG. 19 is a diagram illustrating the operation of a system according to a modification of the embodiment.

Next, the operation of a system according to a modification of the present embodiment will be described with reference to FIG. 19. FIG. 19 is a diagram illustrating the operation of the system according to the modification of the present embodiment. FIG. 19(a) is a perspective view of a back surface of the information terminal 6, and FIG. 19(b) is a perspective view of the user capturing a ceiling image using the information terminal 6.

As illustrated in FIG. 19(a), the information terminal 6 includes an out-camera 110 (an example of a second image capture unit) as well as the in-camera 100. The out-camera 110 is arranged on the back surface of the information terminal 6 and captures an image of a scene in a back direction (an example of a second direction, which is opposite the first direction) of the information terminal 6.

In the present modification, in step S32 illustrated in FIG. 15, the application asks the user to capture an image of the floor 16 of the room 14 at a position to be cleaned. At this time, for example, the display unit 98 of the information terminal 6 displays a message box asking the user to capture an image of the floor 16. The user holds the information terminal 6 with the in-camera 100 directed to the ceiling 20 (refer to FIG. 1) at the first position P1 (refer to FIG. 11) in the room 14 to be cleaned. At this time, as illustrated in FIG. 19(b), the display unit 98 of the information terminal 6 displays an image 112 of the floor 16 viewed from the out-camera 110.

If the user presses a shutter button (not illustrated) of the information terminal 6 in step S33 illustrated in FIG. 15, the in-camera 100 captures an image of the ceiling 20. The information terminal 6 transmits the captured ceiling image to the server device 22 (refer to FIG. 1). At this time, the floor image 112 is only displayed on the display unit 98 of the information terminal 6 and not captured by the out-camera 110.

As described above, by displaying the floor image 112 on the display unit 98 of the information terminal 6 when a ceiling image is captured, the user can intuitively determine a position to be cleaned by the autonomous vacuum cleaner 4.

Other Modifications

Although the method for specifying a position and the like according to one or a plurality of aspects have been described with reference to an embodiment and a modification, the present disclosure is not limited to the embodiment and the modification. The scope of the one or plurality of aspects may also include modes obtained by modifying the embodiment or the modification in various ways conceivable by those skilled in the art and modes constructed by combining components in the embodiment and the modification with each other, insofar as the scope of the present disclosure is not deviated from. For example, the embodiment and the modification may be combined with each other.

Although the information terminal 6 as an image capture device is a smartphone in the above embodiment and the like, for example, the information terminal 6 may be a tablet terminal or the like, instead.

Although the autonomous device is the autonomous vacuum cleaner 4 in the above embodiment and the like, for example, the autonomous device is not limited to this. The autonomous device may be an autonomous carrier robot, for example, that autonomously moves to carry articles, instead.

Although the display unit 98 of the information terminal 6 displays a result of identification in step S38 illustrated in FIG. 15 in the above embodiment, the display unit 98 may display, as a result of identification, a map screen of the room 14 in which the second position P2 is displayed, instead. If the second position P2 is significantly deviated relative to the first position P1, for example, the user may operate the touch panel of the display unit 98 in order to finely adjust the second position P2 on the map screen. As a result, the information terminal 6 transmits positional information regarding the finely adjusted second position P2 to the server device 22, and the server device 22 identifies the finely adjusted second position P2 again.

Some or all of the components of each device may be achieved by an integrated circuit (IC) card or a separate module removably attached to the device. The IC card or the module is a computer system including a microprocessor, a ROM, and a RAM. The IC card or the module may include a super-multifunctional LSI circuit. When the microprocessor operates in accordance with a computer program, the IC card or the module achieves functions thereof. The IC card or the module may be tamper-resistant.

The present disclosure may be the above-described methods. The present disclosure may be a computer program that achieves these methods using a computer, or may be a digital signal including the computer program. In addition, the present disclosure may be a computer-readable recording medium storing the computer program or the digital signal, such as a flexible disk, a hard disk, a CD-ROM, a magneto-optical (MO) disk, a digital versatile disc (DVD), a DVD-ROM, a DVD-RAM, a Blu-ray Disc (BD; registered trademark), or a semiconductor memory. In addition, the present disclosure may be the digital signal stored in one of these recording media. In addition, the present disclosure may be the computer program or the digital signal transmitted through an electrical communication line, a wireless or wired communication line, a network typified by the Internet, datacasting, or the like. In addition, the present disclosure may be a computer system including a microprocessor and a memory. The memory may store the computer program, and the microprocessor may operate in accordance with the computer program. In addition, the present disclosure may be implemented by another independent computer system after storing the program or the digital signal in one of the recording media and transporting the recording medium or after transmitting the program or the digital signal through the network or the like.

The method for specifying a position in the present disclosure is effective in a system or the like that specifies a destination for, for example, an autonomous vacuum cleaner.

What is claimed is:

1. A method for controlling an autonomous device that moves in two dimensions using a controller, the method comprising:
   obtaining, at a first position, which is a destination of the autonomous device, a first image including a target above the first position;
   calculating, from the first image, first feature values indicating certain characteristics of the first image;
   referring to map information indicating correspondences between coordinate information indicating coordinates of defined positions included in a movement area of the autonomous device and second feature values, which are calculated from second images and indicate certain characteristics of the second images, the second images being obtained by capturing, at the defined positions, images of scenes above the defined positions, and identifying, by referring to the map information, a second position corresponding to second feature values having at least a predetermined degree of correspondence to the first feature values;
   generating a command for moving the autonomous device to the second position on the basis of coordinate information corresponding to the second position; and
   transmitting the command to the autonomous device.

2. The method according to claim 1,
   wherein the second feature values, calculated from the second images, include one second feature value corresponding to a plurality of feature points included in each of the second images.

3. The method according to claim 1,
   wherein the movement area includes a floor of a defined area,
   wherein the target includes a ceiling of the defined area, and
   wherein the second images are captured by the autonomous device moving on the floor such that the second images include the ceiling.

4. The method according to claim 3,
   wherein the map information is created by the autonomous device using simultaneous localization and mapping.

5. The method according to claim 1, further comprising capturing the first image by an image capture device connected to the autonomous device through a network.

6. The method according to claim 5, further comprising capturing, by a first camera of the image capture device, a scene in a first direction, and
   capturing, by a second camera of the image capture device, a scene in a second direction, which is opposite the first direction,
   wherein the first image is an image captured by the second camera at the first position with the first camera directed to the first position.

7. The method according to claim 5, further comprising providing a display to the image capture device, and
   displaying, on the display, information indicating the second position.

8. The method according to claim 1,
   wherein the first feature values and the second feature values are calculated using one of following algorithms: oriented features from accelerated segment test and rotated binary robust independent elementary features, scale-invariant feature transform, and speeded up robust features.

9. The method according to claim 1,
wherein the movement area includes a floor of a room, and
wherein the autonomous device is an autonomous vacuum cleaner that cleans the floor while autonomously moving on the floor.

10. The method according to claim 1, the defined positions comprising a position in a room.

11. A terminal device comprising:
a camera;
a display; and
a processor,
wherein the processor is configured to:
control an autonomous device that moves in two dimensions,
cause, at a first position, which is a destination of the autonomous device, the camera to capture a first image including a target above the first position,
display, on the display, information indicating a second position which is a position corresponding to the destination of the autonomous device,
identify the second position on the basis of
(i) first feature values, which are calculated from the first image and indicate certain characteristics of the first image, and
(ii) map information indicating correspondence between
coordinate information indicating coordinates of defined positions in a movement area of the autonomous device, and
second feature values, which are calculated from second images and indicate certain characteristics of the second images, the second images being obtained at the defined positions by capturing images of scenes above the defined positions, and
wherein, the second position is one of the defined positions having second feature values which has at least a predetermined degree of correspondence to the first feature values.

12. The terminal device according to claim 11,
wherein the processor transmits the first image to a server connected to the terminal device through a network,
wherein the server identifies the second position, and
wherein the processor receives the information from the server.

13. A controller that controls an autonomous device that moves in two-dimensions, the controller comprising:
a processor; and
a memory,
wherein the processor is configured to:
obtain, at a first position, which is a destination of the autonomous device, a first image including a target above the first position,
calculate, from the first image, first feature values indicating certain characteristics of the first image,
refer to map information indicating correspondences between coordinate information indicating coordinates of defined positions included in a movement area of the autonomous device and second feature values, which are stored in the memory, and which are calculated from second images, and indicate certain characteristics of the second images, the second images being obtained by capturing, at the defined positions, images of scenes above the defined positions, and identify, by referring to the map information, a second position corresponding to second feature values having at least a predetermined degree of correspondence to the first feature values,
generate a command for moving the autonomous device to the second position on the basis of coordinate information corresponding to the second position, and
transmit the command to the autonomous device.

* * * * *